United States Patent

[11] 3,555,321

[72] Inventors Rolf Gruener
 Oelber Am Weissen Wege;
 Dieter Sobottka, Jever; Rolf Moritz,
 Wilhelmshaven, Germany
[21] Appl. No. 748,988
[22] Filed July 31, 1968
[45] Patented Jan. 12, 1971
[73] Assignee Olympia Werke AG
 Wilhelmshaven, Germany
[32] Priority Aug. 3, 1967
[33] Germany
[31] O 12,689

[54] EDDY CURRENT BRAKE FOR USE IN BUSINESS MACHINES OR THE LIKE
10 Claims, 2 Drawing Figs.
[52] U.S. Cl. .................................................. 310/93,
 310/99
[51] Int. Cl. ................................................. H02k 49/04
[50] Field of Search ........................................ 310/93, 4,
 5, 6, 7, 8, 105, 99; 73/520, 519(Cursory); 324/152

[56] References Cited
UNITED STATES PATENTS
| 3,267,310 | 8/1966 | Ireland ......................... | 310/103 |
| 2,632,859 | 3/1953 | Bessiere ....................... | 310/93 |
| 3,110,462 | 11/1963 | Abendroth et al. ......... | 310/93X |
| 3,433,085 | 3/1969 | Dahlgren ..................... | 310/105X |

Primary Examiner—D. X. Sliney
Attorney—Michael S. Striker

ABSTRACT: An eddy current brake comprises a rotor which is driven by the carriage of a business machine in a gap between two ring-shaped laterally magnetized multipole permanent magnets whereby the eddy currents produce a braking force which is proportional to the speed of the carriage. One of the magnets is adjustable axially toward and away from the other magnet and the rotor is adjustable axially so that it is located midway between the end faces of the magnets. The driving connection between the carriage and the rotor comprises a step-up gear transmission.

PATENTED JAN 12 1971 3,555,321

INVENTOR
ROLF GRÜNER
DIETER SOBOTTKA
ROLF MORITZ
BY
Marlene S. Steinken
ATTORNEY

EDDY CURRENT BRAKE FOR USE IN BUSINESS MACHINES OR THE LIKE

BACKGROUND OF THE INVENTION

The present invention relates to brakes in general, and more particularly to improvements in magnetic brakes which are especially suited for use in business machines. Still more particularly, the invention relates to an improved eddy current brake for use in tabular braking systems of business machines of the type wherein a mobile part carries out movements of different length and the braking action must be commensurate with the speed of the mobile part.

It is already known to employ eddy current brakes in several fields. As a rule, the damping or braking action of such brakes is based on the principle that, when a flat conductor moves at right angles to a magnetic field, there is induced in the conductor an electromotive force which generates eddy currents. The magnitude of the electromotive force (and hence the strength of eddy currents) is proportional to the speed at which the conductor moves with reference to the magnetic field. The conductor is normally a disc.

The second addition No. 46,795 to French Pat. No. 614,242 discloses an eddy current brake which is employed to uniformize the rotational speed of a regulator in a telegraph. A metallic disc which is mounted on the regulator shaft rotates between the legs of a permanent magnet whereby magnetic field induces in the revolving disc eddy currents whose strength is proportional to the rotational speed of the regulator. Thus, when the r.p.m. of the regulator rises, the disc produces a braking force whose magnitude increases proportionally with rising r.p.m. In order to change the magnetic flux, the magnet is adjustable radially of the disc Similar brakes are employed in electricity counters.

German DAS No. 1,188,191 discloses a different eddy current brake which comprises an axially magnetized ring-shaped permanent magnet mounted at the end of a shaft and adjacent to a ferromagnetic plate mounted at the end of a second shaft. The gap between the magnet and the plate accommodates a ring which serves as a regulator to influence the magnetic flux. In all of the aforedescribed conventional eddy current brakes, there develops a direct braking action which is applied to continuously driven part rotating at a constant or nearly constant speed, i.e., the brakes do into employ magnetically movable braking blocks or the like.

U.S. Pat. No. 2,986,257 to D'Onofrio discloses a tabular braking system whose braking force is produced by a generator driven with the carriage of the business machine and is proportional to the speed of such carriage. Current produced by the generator is amplified in a transistor circuit and controls the frictional and braking actions of a braking magnet which is adjacent to a rail on the carriage to thereby reduce the speed of the drawstring which pulls the carriage. This reduces the rotational speed of the generator which is driven by the spring motor for the carriage. Such indirect braking action depends considerably on the surface finish of the rail and on the surface finish of the armature in the magnet. The armature bears against the rail to produce considerable friction. The extent of friction is dependent on the presence of absence of an oil film on the surfaces of the rail and armature, i.e., on a factor which cannot be predicted in advance and which changes when the machine is in use to bring about excessive fluctuations in the braking action.

SUMMARY OF THE INVENTION

It is an object of the present invention to provide a novel and improved eddy current brake for use in business machines or the like and to construct and assemble the brake in such a way that the brake can control the speed of tabulators or like mobile parts even if such parts move at different speeds and perform steps of varying length.

Another object of the invention is to provide a brake whose parts need not be placed into direct frictional engagement with the mobile part or parts of the business machine.

A further object of the invention is to provide an eddy current brake which is particularly suited to control the speed of the carriage in a business machine.

The invention is embodied in a business or like machine which comprises essentially a mobile part movable part movable at a variable speed, a brake having a movable member arranged to produce in a magnetic field eddy currents whose magnitude is proportional to the speed of the moveable member, and a driving connection or transmission between the mobile part and the movable member for moving the member at a speed which is proportional to the speed of the mobile part whereby the resulting eddy currents oppose the movement of the mobile part by tending to oppose the movement of the movable member. The movable member is preferably a metallic rotor and the brake preferably comprises a pair of stationary multipole laterally magnetized permanent magnets disposed at the opposite sides of the rotor. At least one of the magnets is preferably adjustable toward and away from the other magnet and the rotor is preferably adjustable to normally assume a position in the middle of the gap between the magnets.

The novel features which are considered as characteristic of the invention are set forth in particular in the appended claims. The improved eddy current brake itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
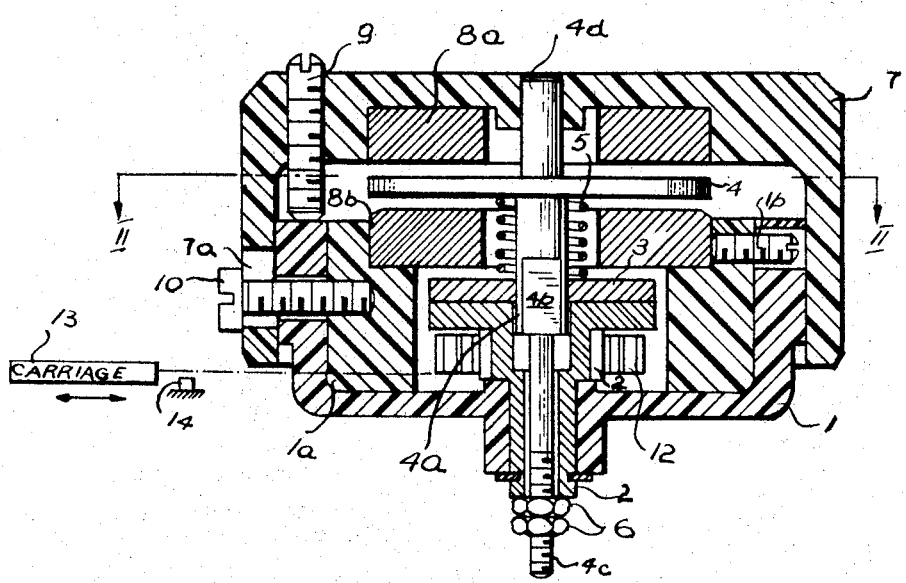
FIG. 1 is an axial sectional view of an eddy current brake which embodies the invention, substantially as seen in the direction of arrows from the line I–I of FIG. 2.
Figure 2:
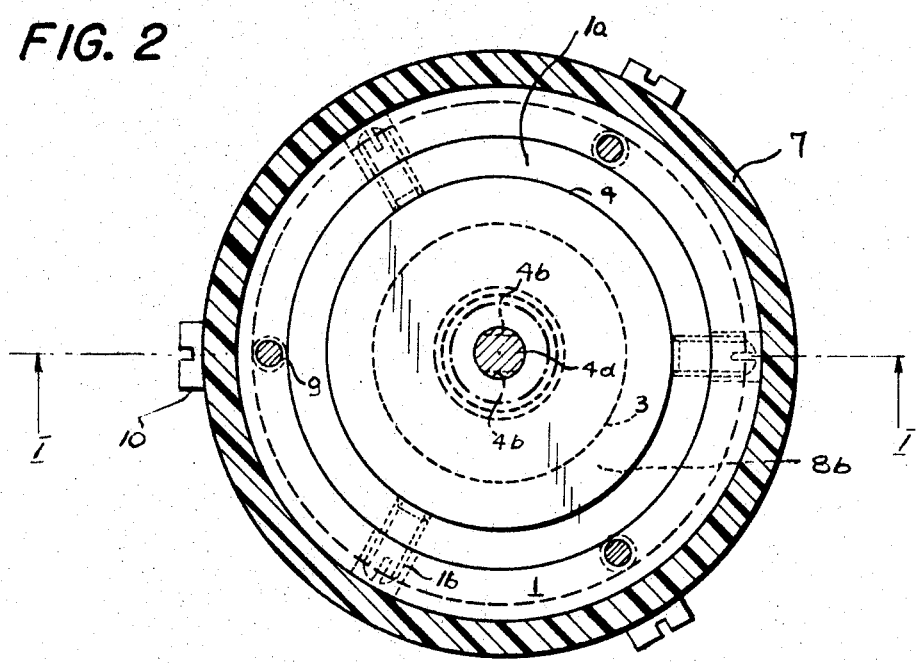
FIG. 2 is a horizontal sectional view as seen in the direction of arrows from the line II–II of FIG. 1.

The eddy current brake of FIGS. 1 and 2 comprises a housing including a cupped main portion 1 which accommodates an annular socket 1a. The bottom wall of the housing portion 1 supports a driving element 2 here shown as a gear which is rigid with a disc-shaped coupling member or rotor 4 has a shaft one end of which (namely, the end 4a) is journaled in the gear 2 and has one or more flats 4b which are received in a complementary opening of the coupling member 3 so that the rotor shares all angular movements of the gear. The shaft of the rotor 4 is reciprocable in the opening of the coupling member 3. A helical coupling spring 5 operates between one side of the rotor 4 and the coupling member 3 to urge the rotor upwardly, as viewed in FIG. 1. The shaft of the rotor 4 has an extension 4c which projects beyond the hub of the gear 2 and is externally threaded to take two lock nuts 6. The nuts 6 constitute a means for changing the axial position of the rotor 4 and cooperate with the coupling spring 5 to maintain the rotor at desired distances from the faces of the two magnets facing each other. The second end 4d the rotor shaft is journaled in a bell-shaped second housing portion 7 which is slidably telescoped onto the main housing portion 1 and accommodates a ring-shaped permanent magnet 8a. The latter is a multipole laterally magnetized permanent magnet. A similar second ring-shaped permanent magnet 8b is mounted in the socket 1a by screws 1b at the opposite side of the rotor 4. The magnetized annular end faces of the magnets 8a, 8b face each other.

The brake further comprises means for adjusting the position of the housing portion 7 with reference to the housing portion 1. Such adjusting means comprises several (preferably three) threaded bolts 9 which mesh with the portion 7 and whose tips abut against the end face of the portion 1. One or more locating or fixing screws 10 extend through axially parallel slots 7a of the portion 7 and mesh with the portion 1; these locating screws 10 can also serve to fix the socket 1a in the housing portion 1. The parts 1, 1a and 7 of the brake preferably consist of nonmagnetic material, for example, of synthetic plastic material, to avoid magnetic leak.

The operation is as follows:

The gear 2 rotates the rotor 4 by way of the coupling member 3 and is driven by a second gear 12 which extends through a cutout 11 provided in the housing portion 1 and indicated in FIG. 2 by a phantom line. The cutout 11 can register with a similar cutout which is preferably provided in the cylindrical wall of the portion 7. Thus, the rotor 4 rotates in the magnetic field between the permanent magnets 8a, 8b whereby the magnetic field induces an eddy current in the rotor which current in turn produces a braking force proportional to the rotational speed of the rotor. The magnitude of the braking force can be adjusted by changing the rotational speed of the rotor 4 as well as by changing the width of the gap between the magnets 8a, 8b, i.e., by loosening the screws 10, by changing the angular position of adjusting bolts 9 and by thereupon reapplying the screws 10. Such adjustment is accompanied by appropriate adjustment of lock nuts 6 so that rotor 4 is located in the middle of the gap between the magnets 8a, 8b.

The width of the gap between the magnets 8a, 8b is adjusted in order to insure a braking action which is proportional to the weight of the carriage 13 in a business machine or the like. The adjustment in conformity with the speed of the carriage 13 is normally automatic, i.e., the second gear 12 which extends through the cutout 11 of the housing portion 1 and meshes with the gear 2 is preferably driven by a rack or the like on the carriage 13 so that the speed of the gear 2 is proportional to the speed of the carriage. Of course, the gear 12 can receive motion through an appropriate transmission which insures that the rotational speed of the gear 2 is a function of the speed of the carriage 13 in such a way that the latter is subjected to an optimal braking action. The gears 2, 12 constitute or form part of a transmission or driving connection between the rotor 4 and the carriage 13, or another mobile part of the machine. If the business machine is provided with exchangeable carriages of different length and hence of different weight, the gear 12 is replaced with a gear of larger or smaller diameter so as to drive the rotor 4 at a speed which is proportional to the weight of that carriage which is in use.

The ratio of the driving connection or transmission between the carriage 13 and the rotor 4 and the strength of the magnetic field between the magnets 8a, 8b are preferably selected in such a way that, when the carriage 13 performs a movement of average length, eddy currents induced in the revolving rotor produce an optimum braking action. If the carriage 13 performs a movement of greater length and hence travels at a higher speed, the rotor 4 is at a higher speed and the induced eddy currents produce a braking action whose strength increases substantially linearly with increasing speed of the rotor. It is normally desirable to employ a stepup transmission.

The advantages of the improved eddy current brake over conventional magnetic brakes and centrifugal brakes are as follows: There is no direct contact between the rotor and the magnets so that the wear on such parts is nonexistent. Also, and since the rotor is not in contact with the magnets, the braking force is produced without friction. The travel of the mobile part (e.g., the carriage 13) which is controlled by the brake is uniform all the way to the stop 14 because the brake does not produce any frictional forces. The braking force can be regulated in a very simple way, without any special tools, and with a high degree of precision, either by changing the width of the gap between the magnets and/or by changing the range of rotational speeds of the rotor.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. In a business machine, a combination comprising a mobile part which is movable at a variable speed; a brake comprising a rotor and a pair of stationary multipole laterally magnetized magnets disposed at the opposite sides of said rotor so that during rotation of said rotor in the field of said magnets eddy currents are produced whose magnitude is proportional to the speed of said rotor; a driving connection between said mobile part and said rotor for moving the latter at a speed which is proportional to that of said part whereby the resulting eddy currents oppose the movement of said part; support means supporting said magnets and said rotor; first mechanical adjusting means cooperating with said support means for adjusting the position of one of said magnets with reference to the other; and second mechanical adjusting means for changing the axial position of said rotor relative to said magnets.

2. A combination as defined in claim 1, wherein said support means comprises a housing having two telescoping portions movable with respect to each other and each supporting one of said magnets, and wherein said first adjusting means cooperate with said housing portions for adjusting the position of one of said housing portions with reference to the other.

3. In a business machine, a combination comprising a mobile part which is movable at a variable speed; a brake comprising a substantially closed housing, a rotor turnably mounted in said housing and a pair of stationary multipole laterally magnetized magnets arranged in said housing to opposite sides of said rotor so that during rotation of said rotor in the fields of said magnets eddy currents are produced whose magnitude is proportional to the speed of said rotor; a driving connection between said mobile part and said rotor for moving the latter at a speed which is proportional to that of said part whereby the resulting eddy currents produce a braking force opposing the movement of said part; and manually operated mechanical regulating means accessible from the outside of said housing and cooperating with said magnets and said rotor for adjusting, at the will of the operator, and independent from the magnetic attraction between said magnets, the distance between said magnets on the one hand and between said magnets and said rotor on the other hand for thus adjusting said braking force at the will of the operator.

4. A combination as defined in claim 3, wherein said housing comprises two portions respectively carrying said magnets fixed thereto and wherein said mechanical adjusting means comprises means for adjusting the position of one housing portion relative to the other and for adjusting the axial position of said rotor relative to said housing portions and the magnets fixed thereto.

5. A combination as defined in claim 3, wherein said magnets are ring-shaped permanent magnets.

6. A combination as defined in claim 3, wherein said driving connection comprises a driving element rotatably mounted in said housing and coupling means connecting said rotor with said driving element.

7. A combination as defined in claim 6, wherein coupling means comprises resilient means.

8. A combination as defined in claim 4 wherein said other housing portion is slidably telescoped into said one housing portion.

9. A combination as defined in claim 6, wherein said driving element is a gear which is coaxial with said rotor.

10. A combination as defined in claim 9, wherein said rotor is a disc which is located midway between said magnets.